(12) United States Patent
Chen et al.

(10) Patent No.: US 11,904,797 B2
(45) Date of Patent: Feb. 20, 2024

(54) BUCKLE FASTENING ASSEMBLY AND CHILD SAFETY SEAT THEREWITH

(71) Applicant: Bambino Prezioso Switzerland AG, Steinhausen (CH)

(72) Inventors: Yingzhong Chen, Guangdong (CN); Qinrui Wei, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

(21) Appl. No.: 17/407,143

(22) Filed: Aug. 19, 2021

(65) Prior Publication Data

US 2022/0055572 A1  Feb. 24, 2022

(30) Foreign Application Priority Data

Aug. 24, 2020 (CN) .......................... 202021789968.4

(51) Int. Cl.
*B60R 22/26* (2006.01)
*B60N 2/28* (2006.01)
*B60R 22/18* (2006.01)

(52) U.S. Cl.
CPC ............ *B60R 22/26* (2013.01); *B60N 2/2812* (2013.01); *B60N 2/2818* (2023.08); *B60N 2002/2815* (2013.01); *B60R 2022/1806* (2013.01)

(58) Field of Classification Search
CPC ............ B60R 22/26; B60R 2022/1806; B60N 2/2812; B60N 2002/2815; B60N 2002/2818
See application file for complete search history.

(56) References Cited

U.S. PATENT DOCUMENTS

| 5,135,285 | A | | 8/1992 | Dukatz | |
|---|---|---|---|---|---|
| 5,673,969 | A | * | 10/1997 | Frazier | B60N 2/2806 297/256.16 |
| 9,238,424 | B1 | * | 1/2016 | Foster | B60N 2/2881 |
| 9,718,435 | B2 | * | 8/2017 | Harada | B60R 22/18 |
| 9,878,642 | B2 | * | 1/2018 | Frank | B60N 2/2812 |
| 11,234,493 | B2 | * | 2/2022 | Pinkney | B60R 22/26 |

(Continued)

FOREIGN PATENT DOCUMENTS

| CN | 101954897 A | 1/2011 |
|---|---|---|
| CN | 105774604 A | 7/2016 |

(Continued)

*Primary Examiner* — Philip F Gabler
(74) *Attorney, Agent, or Firm* — Winston Hsu

(57) ABSTRACT

A buckle fastening assembly is adapted for a child safety seat and includes a cushion body whereon a through hole is formed, and a belt body including a protecting pad and a positioning structure. One end of the positioning structure is connected to the cushion body, another end of the positioning structure passes through the through hole to connect with the protecting pad, and the positioning structure biases the protecting pad away from a working position. When the belt body is not in use, the positioning structure can drive the protecting pad away from the working position by elasticity, so as to prevent the protecting pad from randomly falling on an upper surface of the cushion body, which will not affect a child's riding and can improve the riding comfort. The buckle fastening assembly has advantages of simple structure and easy disassembly, which is convenient to use by caregivers.

17 Claims, 11 Drawing Sheets

(56) References Cited

U.S. PATENT DOCUMENTS

2007/0013184 A1* 1/2007 Gomi .................... B60R 22/18
                                                                280/801.1
2014/0346826 A1* 11/2014 Ishisako ............... B60N 2/2806
                                                                297/256.15

FOREIGN PATENT DOCUMENTS

| DE | 60 2005 004 635 T2 | 11/2008 |
|----|---------------------|---------|
| EP | 2 662 233 B1 | 12/2021 |
| TW | 200400890 | 1/2004 |

* cited by examiner

BUCKLE FASTENING ASSEMBLY AND CHILD SAFETY SEAT THEREWITH

BACKGROUND OF THE INVENTION

1. Field of the Invention

The present invention relates to a buckle fastening assembly and a child safety seat therewith, and more particularly, to a buckle fastening assembly with simple structure and easy disassembly, which is convenient to use by caregivers, and a child safety seat therewith.

2. Description of the Prior Art

Child safety seats are installed on vehicle seats to provide ride and enhanced protection for children, which can effectively improve children's riding safety. A safety belt system of the child safety seat usually includes a shoulder belt and a crotch belt located between a user's legs. The conventional crotch belt is connected to a buckle at one end and connected to a metal bracket at the other end so as to connect to a seat body of the child safety seat. The conventional crotch belt has many defects. For example, when the crotch belt is not in use, the crotch belt connected to the buckle often falls naturally in a center of a seat cushion due to the weight of the buckle. As a result, when a child is to be placed in the child safety seat, the crotch belt and buckle will hinder the child from riding, so the crotch belt must be removed first. When a caregiver holds a baby with both hands, the action of removing the crotch belt in advance often causes trouble for the caregiver. In addition, the crotch belt is connected to the seat body via the metal bracket, and the connecting structure is complicated and difficult to be disassembled, which is inconvenient for cleaning and replacement of the crotch belt. Therefore, there is a need for developing a buckle fastening device with simple structure and easy disassembly, which is convenient to use by caregivers.

SUMMARY OF THE INVENTION

Therefore, an objective of the present invention is to provide a buckle fastening assembly with simple structure and easy disassembly, which is convenient to use by caregivers, for solving the aforementioned problems.

In order to achieve the aforementioned objective, the present invention discloses a buckle fastening assembly adapted for a child safety seat. The buckle fastening assembly includes a cushion body whereon a through hole is formed, and a belt body including a protecting pad and a positioning structure. One end of the positioning structure is connected to the cushion body, another end of the positioning structure passes through the through hole to connect with the protecting pad, and the positioning structure biases the protecting pad away from a working position.

Preferably, the positioning structure is resilient.

Preferably, the one end of the positioning structure is fixedly connected to or detachably connected to the cushion body, and the another end of the positioning structure is fixedly connected with or detachably connected with the protecting pad.

Preferably, the one end of the positioning structure is fixedly connected to a lower surface of the cushion body, and the another end of the positioning structure is detachably connected with the protecting pad.

Preferably, the one end of the positioning structure is fixedly connected to the cushion body in one of sewing connection, adhesive connection and buckling connection, and the another end of the positioning structure is fixedly connected with the protecting pad in one of sewing connection, adhesive connection and buckling connection.

Preferably, the one end of the positioning structure is detachably connected to the cushion body, and the another end of the positioning structure is fixedly connected with the protecting pad.

Preferably, the one end of the positioning structure is detachably connected to the cushion body, and the another end of the positioning structure is detachably connected with the protecting pad.

Preferably, an accommodating space is formed on a lower surface of the cushion body and for accommodating the one end of the positioning structure inside the cushion body.

Preferably, an opening is formed on the protecting pad and for receiving the another end of the positioning structure inside the protecting pad.

Preferably, the protecting pad includes a first end, a second end and a central portion between the first end and the second end, and a width of the first end and a width of the second end are respectively greater than a width of the central portion.

Preferably, the width of the first end is less than the width of the second end.

Preferably, the width of the central portion is greater than a width of the through hole.

Preferably, the width of the central portion is less than or equal to a width of the through hole.

Preferably, an end of the protecting pad is disposed on a lower surface of the cushion body, and another end of the protecting pad passes through the through hole.

Preferably, a first positioning device is disposed on an end of the protecting pad, and a second positioning device is disposed on a lower surface of the cushion body and for engaging with the first positioning device In order to achieve the aforementioned objective, the present invention further discloses a child safety seat including a seat portion and the aforesaid buckle fastening assembly.

In summary, the buckle fastening assembly of the present application includes the positioning structure connected to the protecting pad and the cushion body, which has simple and economical connection structure and easy disassembly. One end of the positioning structure is connected to the lower surface of the cushion body, and another end is connected to the protecting pad. When the belt body is not in use, the positioning structure can drive the protecting pad away from the working position by elasticity, so as to prevent the protecting pad from randomly falling on the upper surface of the cushion body due to its own gravity or the gravity of a buckle, which will not affect a child's riding and can improve the riding comfort. The buckle fastening assembly of the present application has advantages of simple structure and easy disassembly, which is convenient to use by caregivers.

These and other objectives of the present invention will no doubt become obvious to those of ordinary skill in the art after reading the following detailed description of the preferred embodiment that is illustrated in the various figures and drawings.

DETAILED DESCRIPTION

In order to illustrate technical specifications and structural features as well as achieved purposes and effects of the present invention, relevant embodiments and figures are described as follows.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
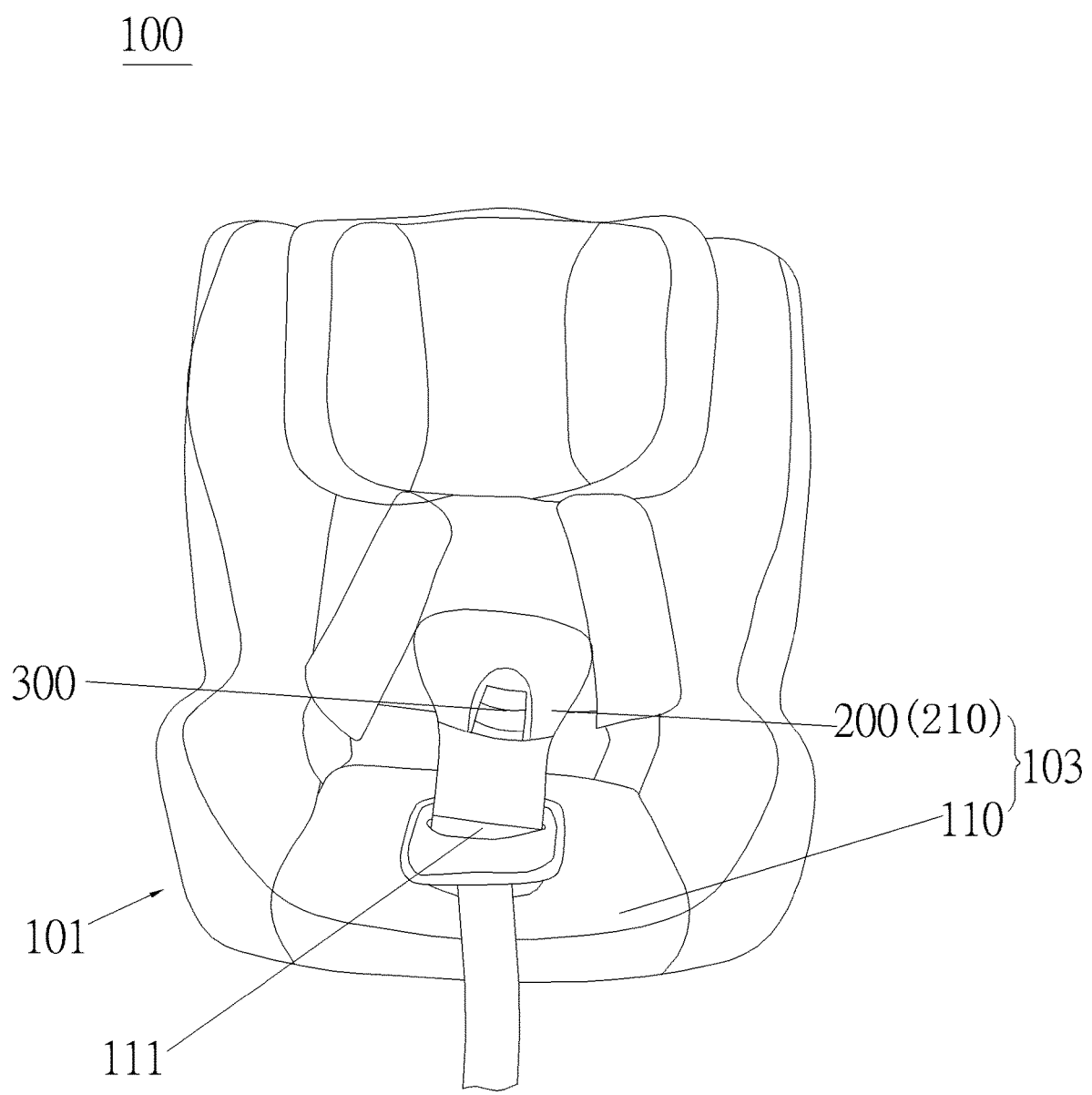
FIG. 1 is a diagram of a child safety seat of the present application.
Figure 2:
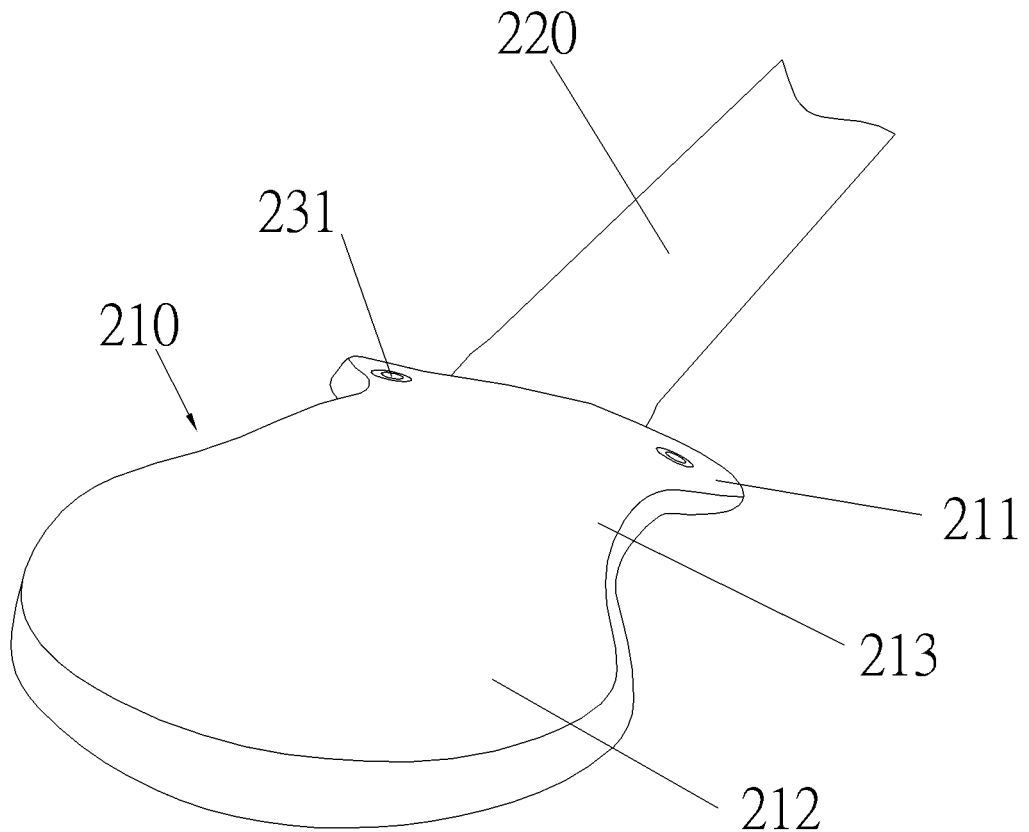
FIG. 2 is a structural diagram of a belt body according to a first embodiment of the present application.

Please refer to FIG. 1 and FIG. 2. FIG. 1 is a diagram of a child safety seat 100 of the present application. FIG. 2 is a structural diagram of a belt body 200 according to a first embodiment of the present application. The child safety seat 100 includes a seat portion 101 and a buckle fastening assembly 103 installed on the seat portion 101. The buckle fastening assembly 103 includes a cushion body 110 whereon a through hole 111 is formed, and the belt body 200 installed in the through hole 111. The belt body 200 includes a protecting pad 210 and a positioning structure 220. One end of the positioning structure 220 is connected to the cushion body 110, another end of the positioning structure 220 passes through the through hole 111 to connect with the protecting pad 210, and the positioning structure 220 is for biasing the protecting pad 210 away from a working position. That is, the protecting pad 210 can be positioned at the working position by overcoming a recovering force of the positioning structure 220. A buckling device 300 is disposed on the belt body 200. After releasing the buckling device 300, the positioning structure 200 can drive the protecting pad 210 connected with the buckling device 300 away from the working position in an unstressed condition, so as to enhance riding comfort.

It should be noted that the belt body 200 can be, but is not limited to, a crotch belt or a shoulder belt. The cushion body 110 can be a cushion pad installed on the seat portion 101, but it is not limited thereto. Specifically, taking the crotch belt as an example but not limited to it, as the belt body 200 is a crotch belt, the buckling device 300 connected to the belt body 200 is used to connect with the shoulder belt on the child safety seat 100 to form a safety belt system of the child safety seat 100 so as to provide safe protection for children. The buckling device 300 can be, but is not limited to, a buckle or strap connection form. Furthermore, the positioning structure 220 can be resilient, that is, the positioning structure 220 can be made of resilient material. For example, the positioning structure 220 can be an elastic sheet, a spring, etc. Specifically, the positioning structure 220 can be, but is not limited to, a PE plate. Furthermore, the one end of the positioning structure 220 can be fixedly connected or detachably connected to the cushion body 110, and the another end of the positioning structure 220 is fixedly connected with or detachably connected with the protecting pad 210. For example, the one end of the positioning structure 220 can be fixedly connected to the cushion body 110 in one of sewing connection, adhesive connection and buckling connection, and the another end of the positioning structure 220 can be fixedly connected with the protecting pad 210 in one of sewing connection, adhesive connection and buckling connection.

Figure 3:
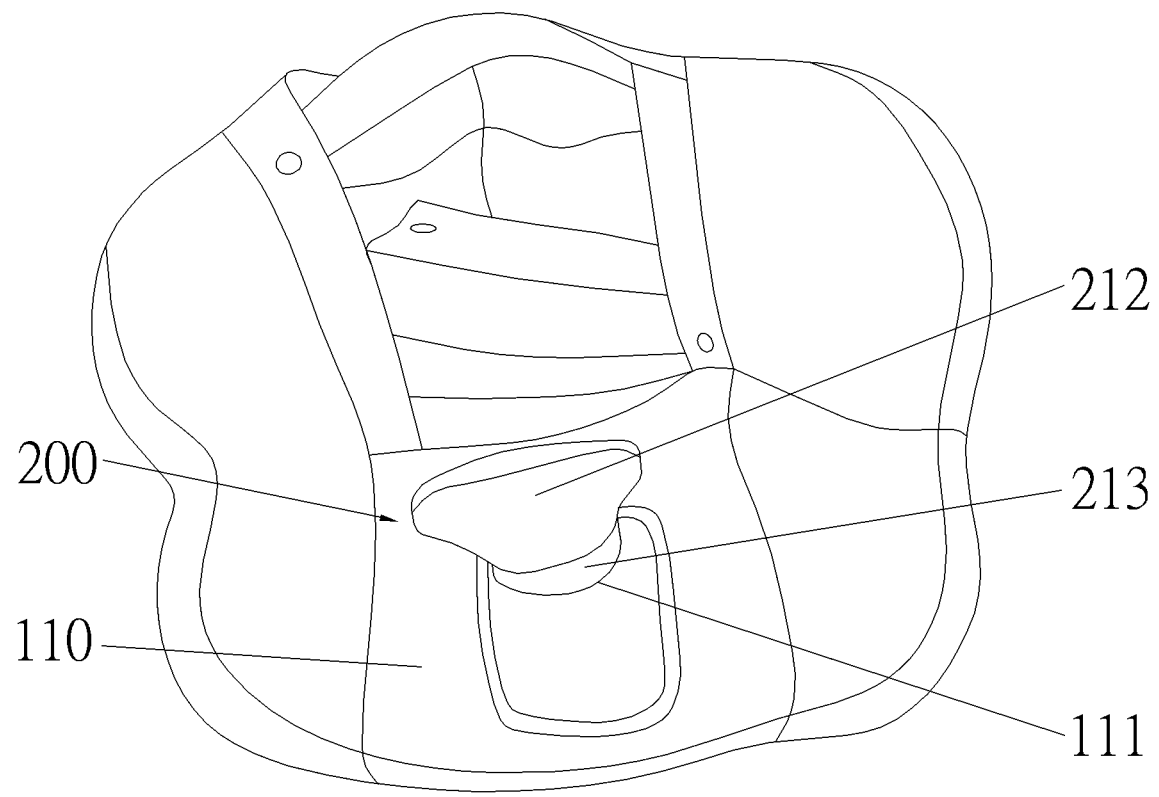
FIG. 3 is a diagram of the partial belt body installed on an upper surface of a cushion body according to the first embodiment of the present application.
Figure 4:
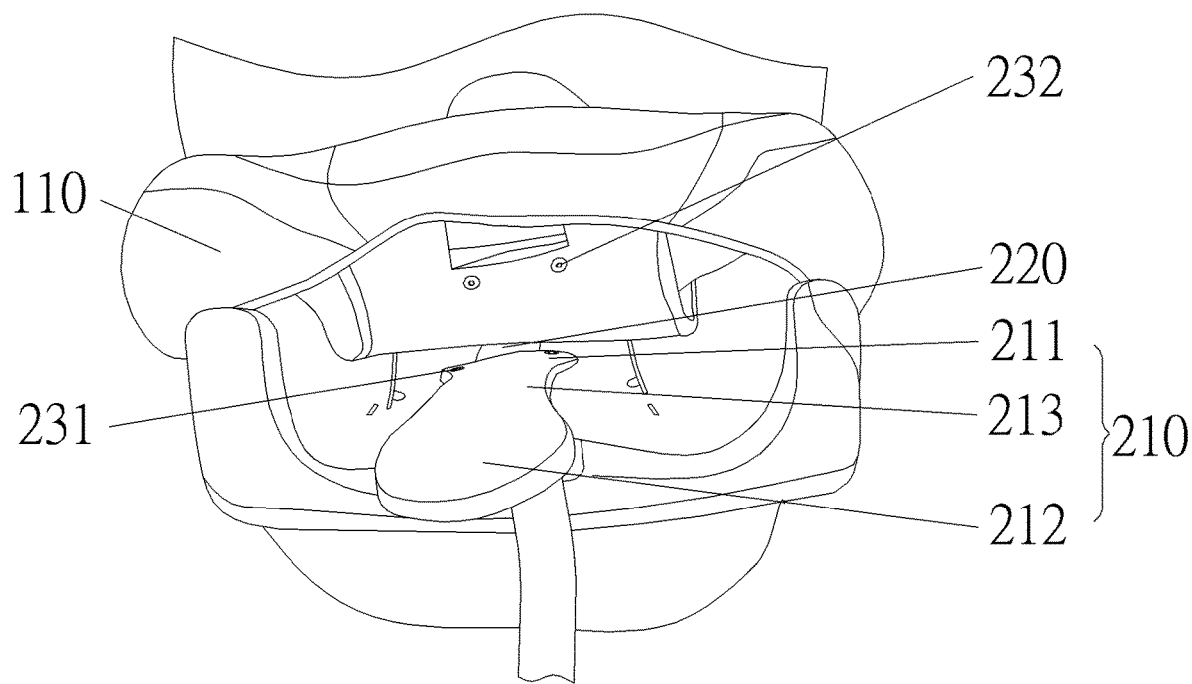
FIG. 4 is a diagram of the partial belt body installed on a lower surface of the cushion body according to the first embodiment of the present application.

Please refer to FIG. 2 to FIG. 4. FIG. 3 is a diagram of the partial belt body 200 installed on an upper surface of the cushion body 110 according to the first embodiment of the present application. FIG. 4 is a diagram of the partial belt body 200 installed on a lower surface of the cushion body 110 according to the first embodiment of the present application. In this embodiment, the one end of the positioning structure 220 is fixedly connected to the cushion body 110, and the another end of the positioning structure 220 is detachably connected with the protecting pad 210. The fixed connection can be, but is not limited to, one of sewing connection, adhesive connection and buckling connection. In this embodiment, the one end of the positioning structure 220 and the cushion body 110 can be fixedly connected by sewing, so that the positioning structure 220 and the cushion body 110 are connected stably, thereby not being easy to fall off. An opening is formed on the protecting pad 210 and for receiving the another end of the positioning structure 220 inside the protecting pad 210. The another end of the positioning structure 220 can be, but is not limited to, used for inserting into, passing through, or extending into the protecting pad 210 through the opening. The protecting pad 210 also can cover or wrap the another end of the positioning structure 220, but it is not limited thereto. Practically, the protecting pad 210 can provide support for the positioning structure 220. In order to make illustration of the connection of the positioning structure 220 and the protecting pad 210 more clear, the protecting pad 210 and the positioning structure 220 are not inserted into the through hole 111 in FIG. 4. Since the positioning structure 220 and the protecting pad 210 are detachably connected, such as directly inserting the positioning structure 220 into the protecting pad 210, it is convenient to replace the protecting pad 210. When the belt body 200 is not in use, the positioning structure 220 covered by the protecting pad 210 can bounce the protecting pad 210 away, that is, the positioning structure 220 can drive the protecting pad 210 away from the working position, so as to move the protecting pad 210 away from a central portion of the child safety seat 100, which will not affect the child's riding and can improve the riding comfort.

Furthermore, please refer to FIG. 2. In the first embodiment, the protecting pad 210 includes a first end 211, a second end 212 and a central portion 213 between the first end 211 and the second end 212. A width of the first end 211 and a width of the second end 212 are respectively greater than a width of the central 1123 portion 213, and the width of the central portion 213 of the protecting pad 210 is greater than a width of the through hole 111. The structural configuration of the protecting pad 210 with larger ends and a smaller center cannot only provide aesthetic appearance but also prevent the protecting pad 210 from falling off from the through hole 111. The configuration with wider ends also can ensure that children are not touched. Furthermore, a first positioning device 231 is disposed on an end of the protecting pad 210, and a second positioning device 232 is disposed on a lower surface of the cushion body 110 and for engaging with the first positioning device 231. The first positioning device 231 can engage with the second positioning device 232 so that the belt body 200 can be stably fixed to the cushion body 110. For example, the first positioning device 231 can be a male snap fastener, and the second positioning device 232 can be a female snap fastener for fastening with the male snap fastener, but it is not limited thereto. For example, the first positioning device 231 can engage with the second positioning device 232 by means of Velcro fasteners. There can be multiple sets of the first positioning device 231 and the second positioning device 232 according to actual design demands to increase the stability of the connection, but it is not limited thereto.

Please refer to FIG. 3. In the first embodiment, the belt body 200 passes through the through hole 111 on the cushion body 110. Specifically, the second end 212 of the protecting pad 210 is located on the upper surface of the cushion body 111, and the first end 211 of the protecting pad 210 passes through the through hole 111 to connect with the cushion body 111. Preferably, the first end 211 of the protecting pad 210 passes through the through hole 111 to be located on the lower surface of the cushion body 111. Therefore, the first positioning device 231 is disposed on the first end 211 to facilitate connection with the second positioning device 232. The protecting pad 210 can be made of flexible material with a certain thickness, and the interior of the protecting pad 210 can be filled with sponge or other fillers to prevent the protecting pad 210 from being too thin to cause harm to children.

Figure 5:
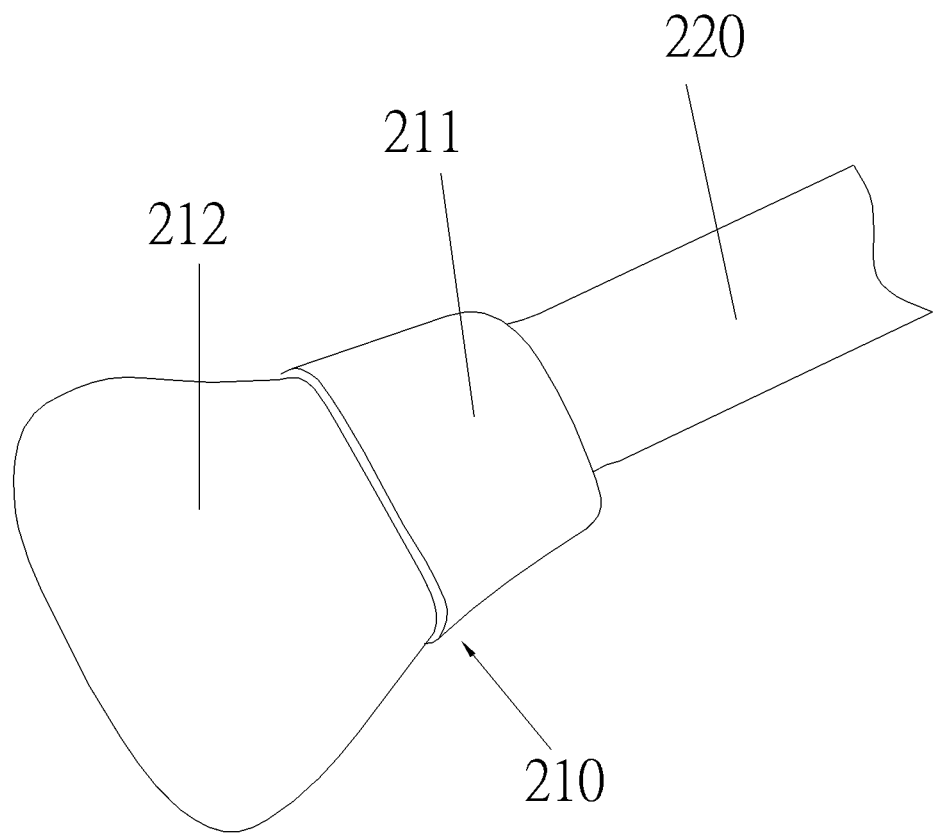
FIG. 5 is a structural diagram of the belt body according to a second embodiment of the present application.
Figure 6:
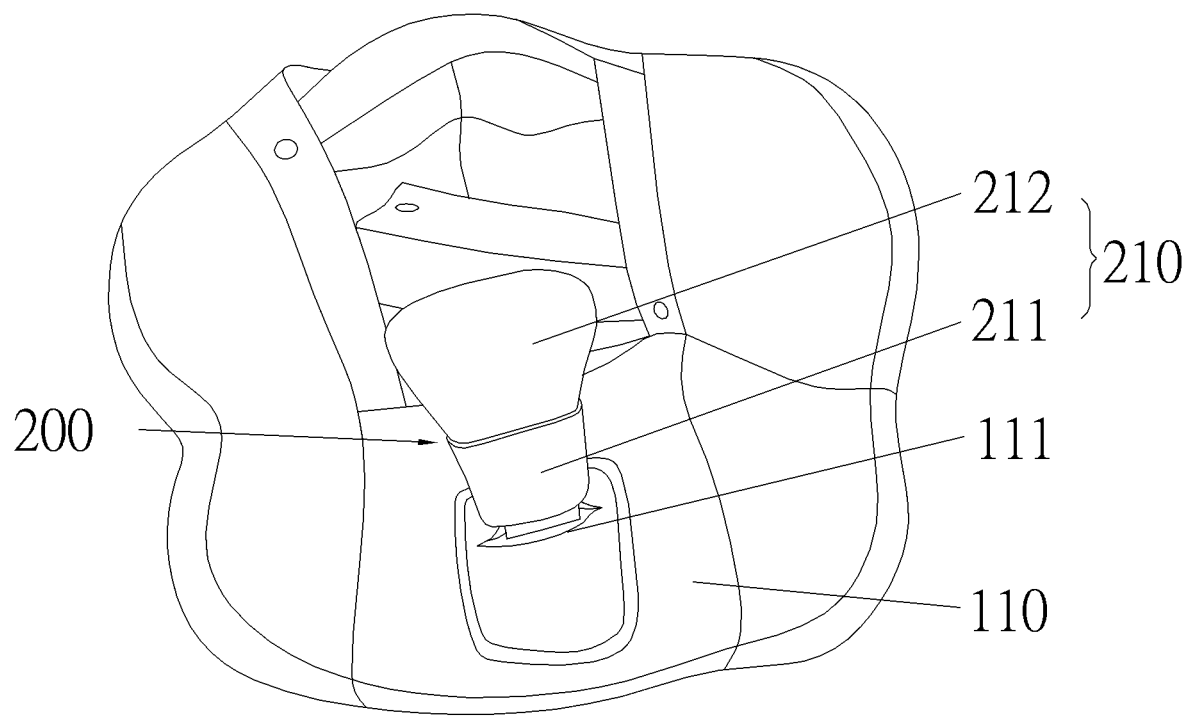
FIG. 6 is a diagram of the partial belt body installed on the upper surface of the cushion body according to the second embodiment of the present application.
Figure 7:
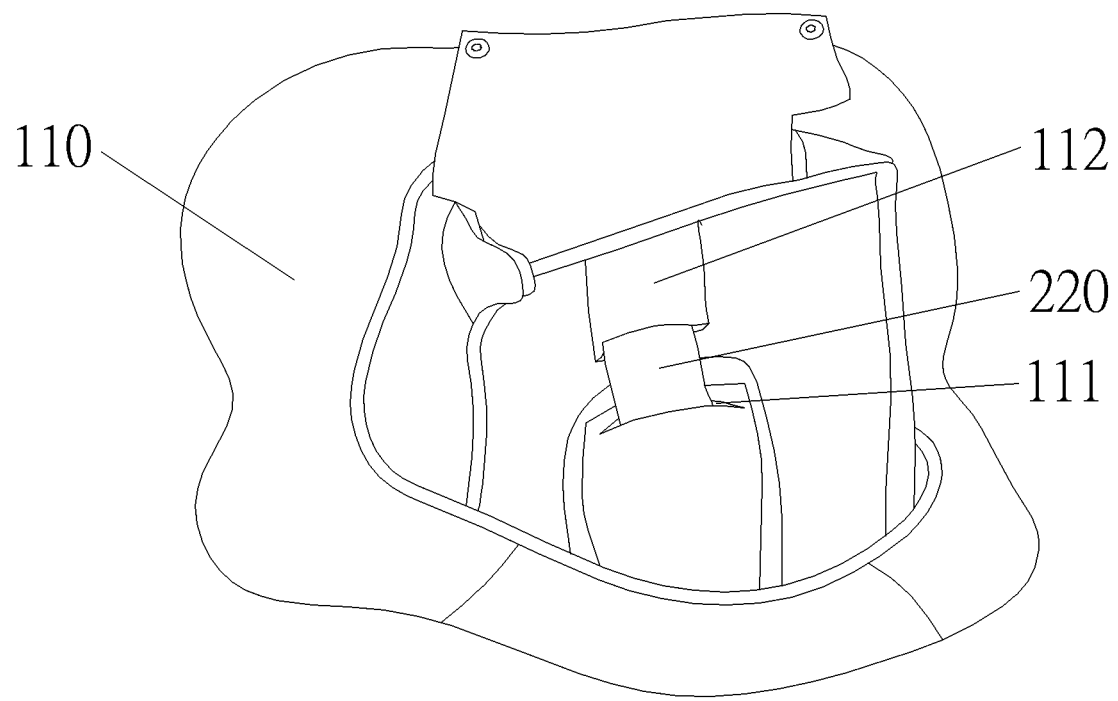
FIG. 7 is a diagram of the partial belt body installed on the lower surface of the cushion body according to the second embodiment of the present application.

Please refer to FIG. 5 to FIG. 7. FIG. 5 is a structural diagram of the belt body 200 according to a second embodiment of the present application. FIG. 6 is a diagram of the partial belt body 200 installed on the upper surface of the cushion body 110 according to the second embodiment of the present application. FIG. 7 is a diagram of the partial belt body 200 installed on the lower surface of the cushion body 110 according to the second embodiment of the present application. In this embodiment, the one end of the positioning structure 220 is detachably connected to the cushion body 110 as shown in FIG. 7, and the another end of the positioning structure 220 is detachably connected with the protecting pad 210 as shown in FIG. 6. The connections between the positioning structure 220 and the cushion body 110 and the protecting pad 210 are not fixed connections, which is convenient in assembly and disassembly, and the protecting pad 210 can be separately detached for cleaning. Specifically, please refer to FIG. 7, an accommodating space 112 is formed on the lower surface of the cushion body 110 and for accommodating the one end of the positioning structure 220 inside the cushion body 110 for achieving detachable connection. The one end of the positioning structure 220 can be, but is not limited to, used for inserting into, passing through, or extending into the accommodating space 112. The cushion body 110 can cover or wrap the one end of the positioning structure 220 via the accommodating space 112, but it is not limited thereto. An opening is formed on the protecting pad 210 and for receiving the another end of the positioning structure 220 inside the protecting pad 210, so as to achieve detachable connection. The another end of the positioning structure 220 can be, but is not limited to, used for inserting into, passing through, or extending into the protecting pad 210 through the opening. The protecting pad 210 also can cover or wrap the another end of the positioning structure 220 through the opening, but it is not limited thereto. The protecting pad 210 also can provide support for the positioning structure 220.

Furthermore, in the second embodiment, the width of the first end 211 of the protecting pad 210 is less than the width of the second end 212 of the protecting pad 210, and the positioning structure 220 can pass through the protecting pad 210 from the first end 211. The first end 211 of the protecting pad 210 can pass through the through hole 111 or not. As the width of the first end 211 of the protecting pad 210 is greater than the width of the through hole 111, the protecting pad 210 can be prevented from falling out of the through hole 111. As the width of the first end 211 of the protecting pad 210 is less than or equal to the width of the through hole 111, the protecting pad 210 can be partially received in the through hole 111, and the friction between the protecting pad 210 and the cushion body 110 can prevent the protecting pad 210 from sliding during use. In this embodiment, both ends of the positioning structure 220 are respectively connected to the cushion body 110 and the protecting pad 210 by inserting, which has simple connection and is easy to replace, but it is not limited thereto.

Figure 8:
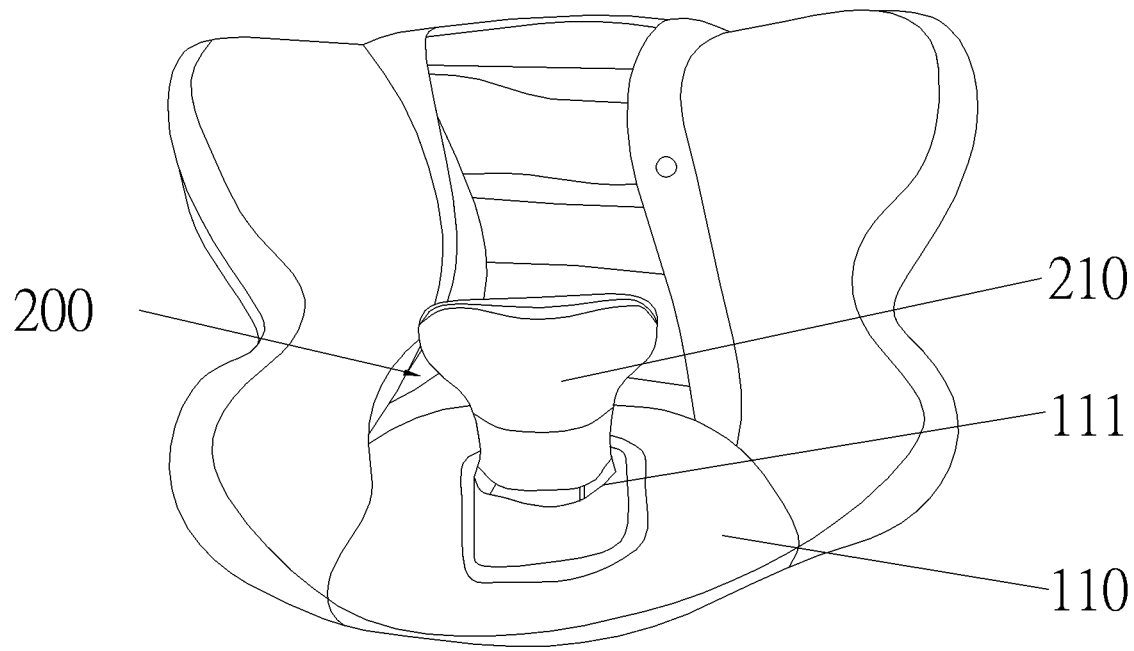
FIG. 8 is a diagram of the partial belt body installed on the upper surface of the cushion body according to a third embodiment of the present application.
Figure 9:
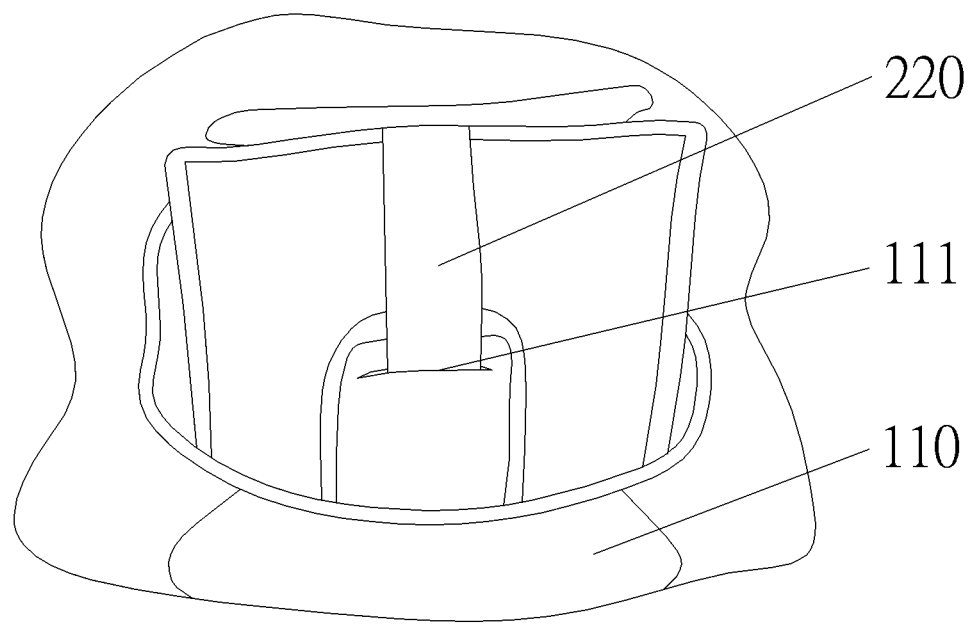
FIG. 9 is a diagram of the partial belt body installed on the lower surface of the cushion body according to the third embodiment of the present application.

Please refer to FIG. 8 and FIG. 9. FIG. 8 is a diagram of the partial belt body 200 installed on the upper surface of the cushion body 110 according to a third embodiment of the present application. FIG. 9 is a diagram of the partial belt body 200 installed on the lower surface of the cushion body 110 according to the third embodiment of the present application. The third embodiment is similar with the second embodiment, and the differences between the third embodiment and the second embodiment are introduced as follows. In the third embodiment, the one end of the positioning structure 220 is fixedly connected to the cushion body 110, and the another end is fixedly connected to the protecting pad 210. That is, both ends of the positioning structure 220 are respectively connected with the cushion body 110 and the protecting pad 210 in stably and firmly fixed connections, which can prevent the belt body 200 from sliding randomly during use. The fixed connection can be, but is not limited to, one of sewing connection, adhesive connection and buckling connection. Specifically, in this embodiment, the one end of the positioning structure 220 can be connected to the cushion body 110 in a sewing connection, and the another end of the positioning structure 220 can extend into the protecting pad 210 through the opening and be connected with the protecting pad 210 in a sewing connection, but it is not limited thereto.

Figure 10:
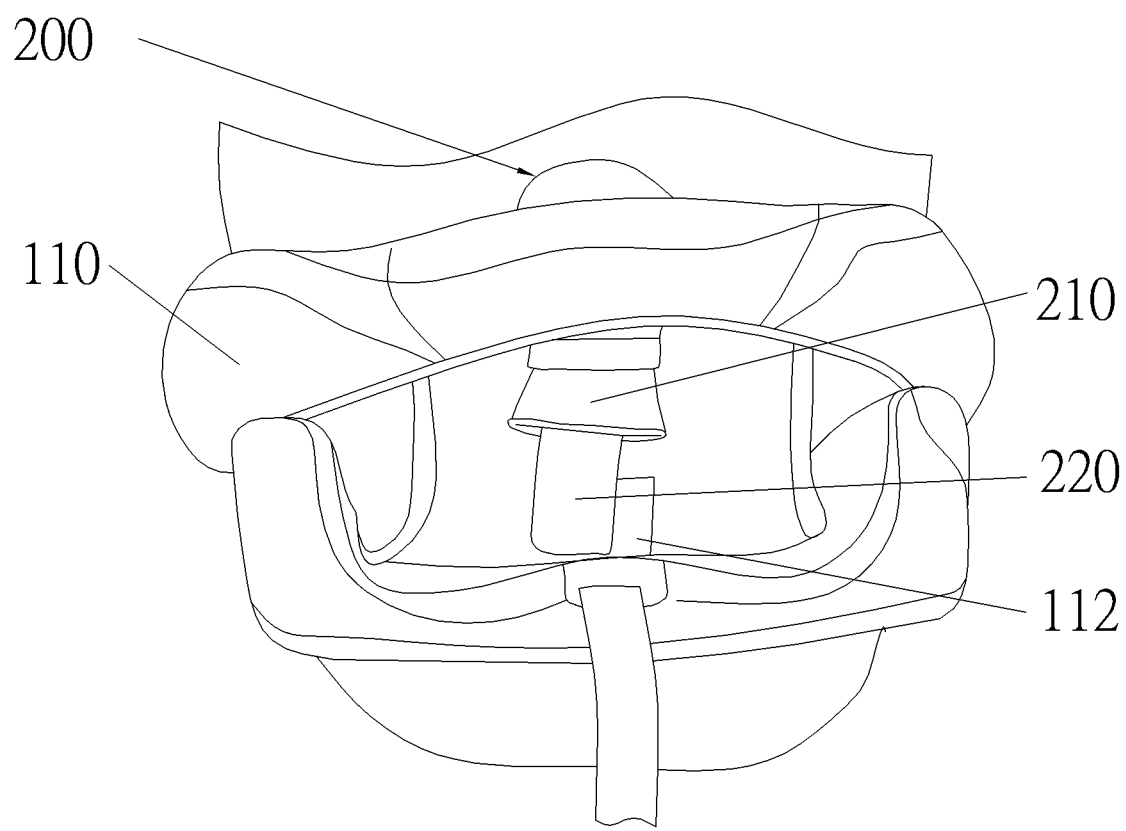
FIG. 10 and FIG. 11 are diagrams of the partial belt body installed on the lower surface of the cushion body at different statuses according to a fourth embodiment of the present application.
Figure 11:
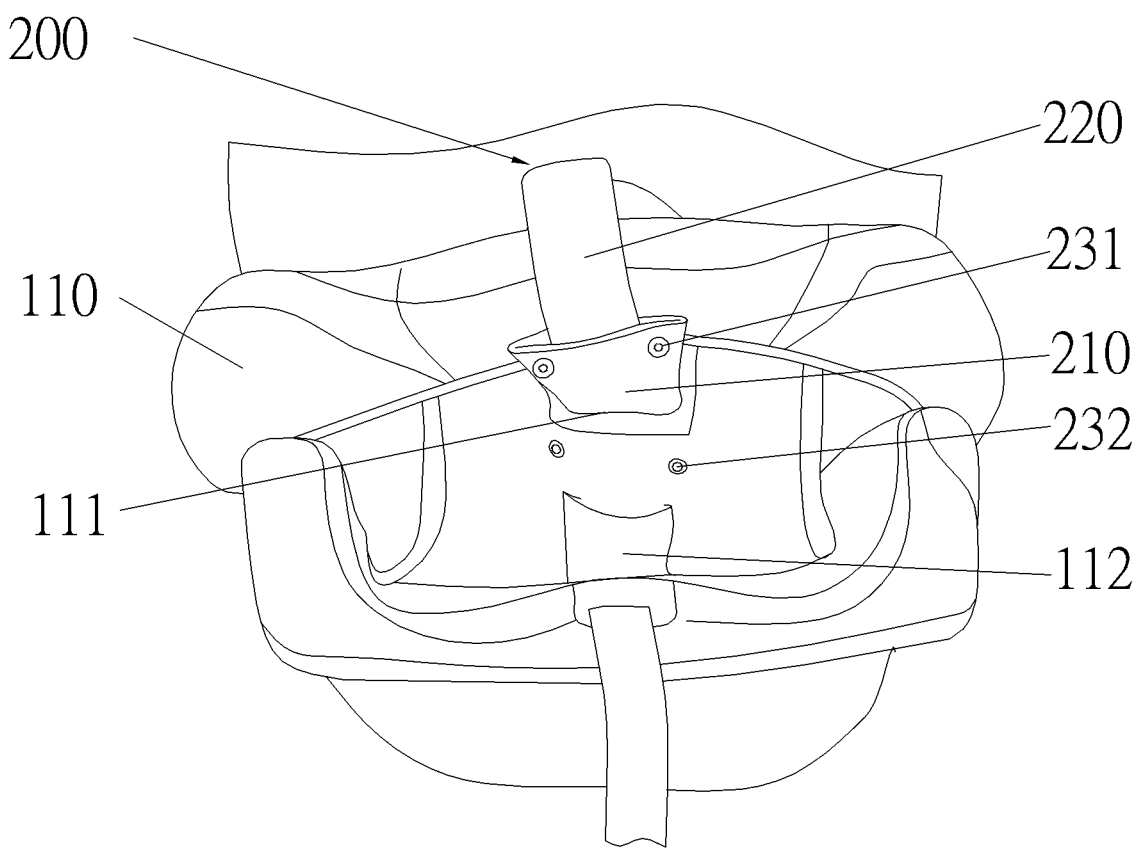

Please refer to FIG. 10 and FIG. 11. FIG. 10 and FIG. 11 are diagrams of the partial belt body 200 installed on the lower surface of the cushion body 110 at different statuses according to a fourth embodiment of the present application. The fourth embodiment is similar with the first embodiment, and the differences between the fourth embodiment and the first embodiment are introduced as follows. In the fourth embodiment, the one end of the positioning structure 220 is detachably connected to the cushion body 110, and the another end is detachably connected to the protecting pad 210. That is, the connections between the positioning structure 220 and the cushion body 110 and the protecting pad 210 are not fixed connections, which has simple connection and easy replacement. Specifically, the accommodating space 112 is formed on the lower surface of the cushion body 110 and for accommodating the one end of the positioning structure 220 inside the cushion body 110 for achieving detachable connection. The one end of the positioning structure 220 can be, but is not limited to, used for inserting into, passing through, or extending into the accommodating space 112, so as to achieve the detachable connection. The cushion body 110 can cover or wrap the one end of the positioning structure 220 via the accommodating space 112, but it is not limited thereto. An opening is formed on the protecting pad 210 and for receiving the another end of the positioning structure 220 inside the protecting pad 210, so as to achieve detachable connection. The another end of the positioning structure 220 can be, but is not limited to, used for inserting into, passing through, or extending into the protecting pad 210 through the opening, so as to achieve detachable connection. The protecting pad 210 can cover or wrap the another end of the positioning structure 220, but it is not limited thereto. The protecting pad 210 also can provide support for the positioning structure 220. Furthermore, the first positioning device 231 is disposed on an end of the protecting pad 210, and the second positioning device 232 is disposed on the lower surface of the cushion body 110 and for engaging with the first positioning device 231. The first positioning device 231 can engage with the second positioning device 232 so that the belt body 200 can be stably fixed to the cushion body 110. There can be multiple sets of the first positioning device 231 and the second positioning device 232 according to actual design demands to increase the stability of the connection, but it is not limited thereto.

In contrast to the prior art, the buckle fastening assembly 103 of the present application includes the positioning structure 220 connected to the protecting pad 210 and the cushion body 110, which has simple and economical connection structure and easy disassembly. The one end of the positioning structure 220 is connected to the lower surface of the cushion body 110, and the another end is connected to the protecting pad 210. When the belt body 200 is not in use, the positioning structure 220 can drive the protecting pad 210 away from the working position by elasticity, so as to prevent the protecting pad 210 from randomly falling on the upper surface of the cushion body 110 due to its own gravity or the gravity of a buckle, which will not affect the child's riding and can improve the riding comfort. The buckle fastening assembly of the present application has advantages of simple structure and easy disassembly, which is convenient to use by caregivers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buckle fastening assembly adapted for a child safety seat, the buckle fastening assembly comprising:
a cushion body whereon a through hole is formed; and
a belt body comprising a protecting pad and a positioning structure, one end of the positioning structure being connected to the cushion body, another end of the positioning structure passing through the through hole to connect with the protecting pad, and the positioning structure forwardly biasing the protecting pad away from a central portion of a backrest of the child safety seat, wherein a first positioning device is disposed on an end of the protecting pad, and a second positioning device is disposed on a lower surface of the cushion body and for engaging with the first positioning device.

2. The buckle fastening assembly of claim 1, wherein the positioning structure is resilient.

3. The buckle fastening assembly of claim 1, wherein the one end of the positioning structure is fixedly connected to or detachably connected to the cushion body, and the another end of the positioning structure is fixedly connected with or detachably connected with the protecting pad.

4. The buckle fastening assembly of claim 3, wherein the one end of the positioning structure is fixedly connected to a lower surface of the cushion body, and the another end of the positioning structure is detachably connected with the protecting pad.

5. The buckle fastening assembly of claim 3, wherein the one end of the positioning structure is fixedly connected to the cushion body in one of sewing connection, adhesive connection and buckling connection, and the another end of the positioning structure is fixedly connected with the protecting pad in one of sewing connection, adhesive connection and buckling connection.

6. The buckle fastening assembly of claim 3, wherein the one end of the positioning structure is detachably connected to the cushion body, and the another end of the positioning structure is fixedly connected with the protecting pad.

7. The buckle fastening assembly of claim 3, wherein the one end of the positioning structure is detachably connected to the cushion body, and the another end of the positioning structure is detachably connected with the protecting pad.

8. The buckle fastening assembly of claim 7, wherein an accommodating space is formed on a lower surface of the cushion body and for accommodating the one end of the positioning structure inside the cushion body.

9. The buckle fastening assembly of claim 7, wherein an opening is formed on the protecting pad for receiving the another end of the positioning structure inside the protecting pad.

10. The buckle fastening assembly of claim 1, wherein the protecting pad comprises a first end, a second end and a central portion between the first end and the second end, and a width of the first end and a width of the second end are respectively greater than a width of the central portion.

11. The buckle fastening assembly of claim 10, wherein the width of the first end is less than the width of the second end.

12. The buckle fastening assembly of claim 11, wherein the width of the central portion is greater than a width of the through hole.

13. The buckle fastening assembly of claim 11, wherein the width of the central portion is less than or equal to a width of the through hole.

14. The buckle fastening assembly of claim 10, wherein the width of the central portion is greater than a width of the through hole.

15. The buckle fastening assembly of claim 10, wherein the width of the central portion is less than or equal to a width of the through hole.

16. The buckle fastening assembly of claim 1, wherein an end of the protecting pad is disposed on a lower surface of the cushion body, and another end of the protecting pad passes through the through hole.

17. A child safety seat comprising a seat portion and the buckle fastening assembly of claim 1.

* * * * *